Aug. 31, 1954     G. W. MOSHER     2,687,524
ADJUSTABLE AND REMOVABLE EYESHADE FOR EYEGLASSES
Filed June 24, 1953
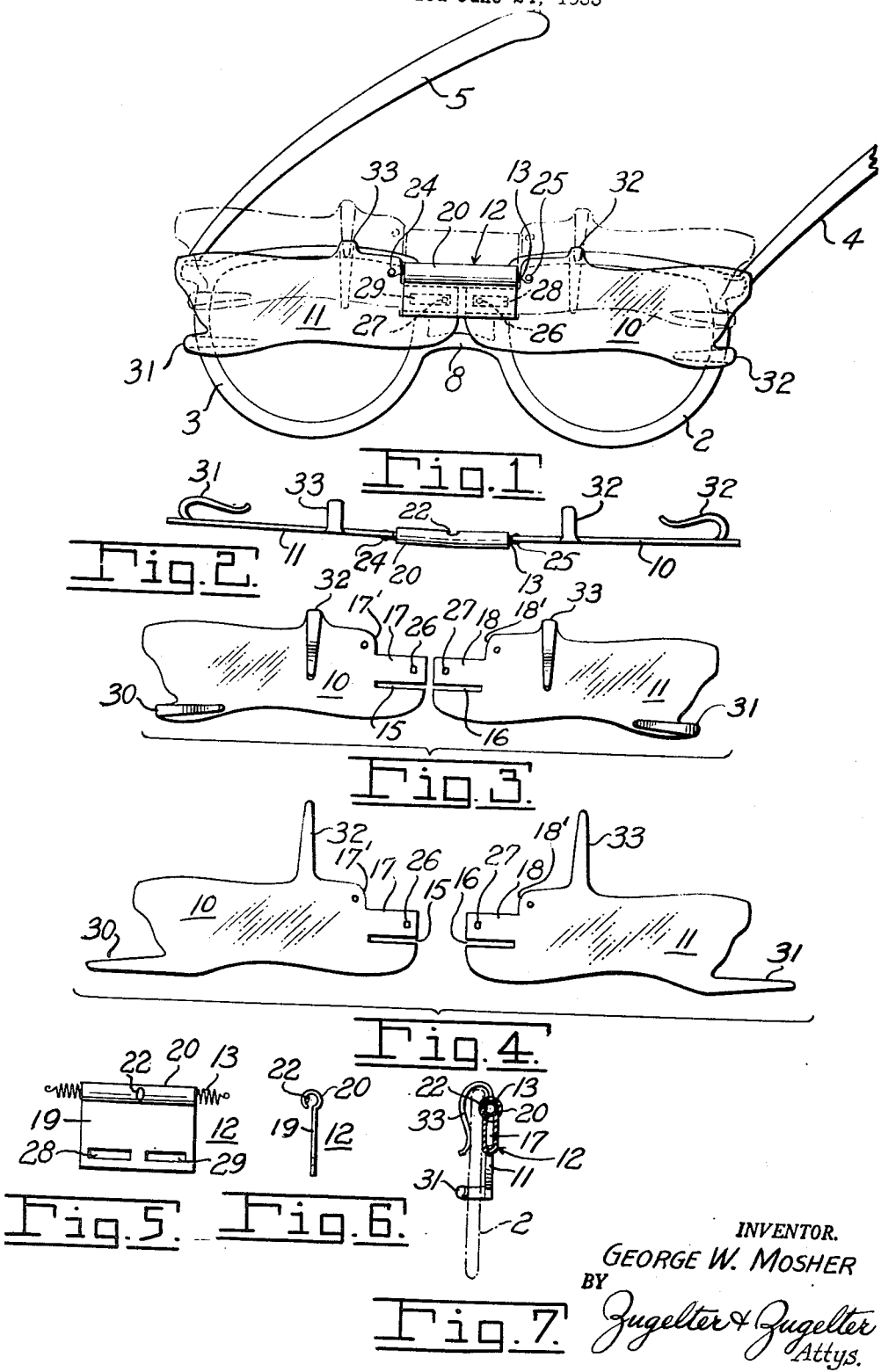
INVENTOR.
GEORGE W. MOSHER
BY
Zugelter & Zugelter
Attys.

Patented Aug. 31, 1954

2,687,524

UNITED STATES PATENT OFFICE 2,687,524

ADJUSTABLE AND REMOVABLE EYESHADE FOR EYEGLASSES

George W. Mosher, Monfort Heights, Ohio

Application June 24, 1953, Serial No. 363,745

6 Claims. (Cl. 2—13)

This invention relates to eye shades, and more particularly to eye shades that may be removably attached to eye glass frames, and adjusted vertically on the frames between an uppermost and a lowermost position, including intermediate positions, according to the needs of the wearer.

An object of this invention is to provide an inexpensive and effective eye shade attachment for eye glass frames, which is so constructed that it may be adjusted vertically in a single vertical plane on the eye glass frames between two maximum positions, an uppermost and a lowermost position, including intermediate positions, the construction embodying means for yieldingly urging the outer ends of the shades against the eye glass frames, so that they may be frictionally held in any of the positions to which it is adjusted.

Another object of the invention is to provide a shade attachment for eye glass frames, that embodies two tinted strips mounted end to end, the ends being slidably supported by a support member located approximately at the nose piece location of the eye glass frames, which support is provided with means for yieldingly urging the strips towards each other. The yielding means permits extension of the strips to separate them at their adjacent inner ends, to facilitate attaching the shade to, or removing it from, an eye glass frame, and also serving to hold the eye shade in positions other than the uppermost and lowermost positions.

A further object of the invention is to provide an eye shade of the type referred to in the preceding object, in which the strips are relatively narrow, so that when adjusted to their lowermost position, the wearer may have clear vision when looking under the lowermost edges thereof, and shaded vision when looking through the tinted strips, and that when raised to the uppermost position, the tinted strips shade the eyes but permit clear vision straight ahead.

Other objects of the invention will be apparent to those of ordinary skill in the art to which it pertains, from the following description and the accompanying drawings.

In the drawings:

Figure 1 is a view, somewhat in perspective, of an eye glass frame having mounted thereon an eye shade arranged and constructed in accordance with an embodiment of the invention;

Fig. 2 is a top edge view of the shade shown in Fig. 1;

Fig. 3 is a plan view of the inner faces of the strips of the shade shown in Figs. 1 and 2, with the central support and yielding means removed to illustrate the construction of the tinted strips;

Fig. 4 is a view of the right and left-hand strips embodied in the eye shade of Figs. 1 and 2, in an initial stage of construction;

Fig. 5 is a view of a support member and yielding means, which is attached to the inner ends of the strips shown in Figs. 3 and 4;

Fig. 6 is an end view of the member shown in Fig. 5; and

Fig. 7 is an enlarged view in section taken on line VII—VII of Fig. 2.

In Fig. 1 of the drawings is illustrated an eye glass frame 1, having lens frames 2 and 3, and temple pieces 4 and 5 attached by means of hinges 6 and 7, respectively, to the lens frames 2 and 3. The lens frames 2 and 3 are connected by a nose or bridge piece 8.

The eye shade 9, embodying the invention, is shown attached to the lens frames 2 and 3. The eye shade 9 comprises left and right tinted strips 10 and 11, which are connected at their inner ends by a support 12. The inner ends of the strips 10 and 11 are slidably supported in the support 12, and are yieldingly urged towards each other by a yielding means 13.

As shown in Figs. 3 and 4, the inner ends of strips 10 and 11 are provided with slots 15 and 16, respectively, thereby forming tongues 17 and 18. Tongues 17 and 18 are slidably received in the support member 12. The inner upper edges of strips 10 and 11 are preferably provided with approximately right-angled notches 17' and 18', so that when the shade is assembled, the support 12 will substantially cover the entire upper edges of tongues 17 and 18. By so covering these upper edges, transmission of light through these edges is minimized, if not fully prevented.

Support member 12 comprises a sheet of material 19, having at its upper edge a tubular portion 20. The lower portion of the strip is returnbent, to form a relatively flat loop 21. The tongues 17 and 18 are received in the loop 21 from the opposite ends thereof, as shown in Figs. 1 and 2.

In the tubular portion 20, the yielding means 13 is located. The particular yielding means 13 illustrated comprises a coiled spring that extends through the tubular portion with its opposite ends extending beyond the same. The spring is attached to the tubular portion, preferably at its center. The attachment may be effected by crimping the tubular portion, as at 22. By crimping is meant that the tubular portion is collapsed, as at 22, to thereby secure the spring at its middle portions to the middle portion of the tubular portion 20.

The ends of the spring are trimmed to length and stretched and fastened to the strips 10 and 11, by means of rivets 24 and 25. By stretching the ends of the springs to a position where the ends are riveted to the tinted strips, the tension in the springs, when the strips are released, will pull the strips towards each other, so that the inner ends thereof will come into engagement, or approximately so, when the eye shades are detached from a spectacle frame.

In order to limit the extension of the spring and the separation of the inner ends of the strips 10 and 11, as by pulling on the outer ends of these strips 10 and 11, the tongues 17 and 18 are provided with lugs 26 and 27, that are received in slots 28 and 29 of the return bend portion 21. These lugs 26 and 27, and the slots 28 and 29, are on the inner face of the shade and therefore are not visible when a person is wearing the shades on eye glass frames, as shown in Fig. 1.

As shown in Fig. 3, the outer ends of strips 10 and 11 are provided with hooks 30 and 31, respectively. These hooks extend rearwardly from the front of the strips 10 and 11, and are located near the lowermost edge of the strips. Hooks 30 and 31 receive the outer portions of the lens frames 2 and 3 and, when mounted in place, are below the hinges 6 and 7 of the eye glass frame. Strips 10 and 11 are also provided with hooks 32 and 33 at the uppermost edges thereof. These hooks are located approximately over the center of the lens frames 2 and 3, and extend rearwardly of the strips 10 and 11 and downwardly, as shown, to thereby receive the upper edges of the lens frames 2 and 3, respectively.

Tinted strips 10 and 11 may be made as shown in Fig. 4, by blanking them in a die to form the slots 15, 16, the tongues 17 and 18, and the hooks 30 and 32 and 31 and 33. After these strips have been blanked, the tabs which form the hooks are bent to the shape shown in the drawings. The support member 12 is then formed from a sheet of metal, for example. In the forming of this support, the upper edge is curled to form a tubular upper edge portion 20. The lower portion is slotted to form the slots 28 and 29, and then the same is return-bent on itself, as shown in Fig. 7, to form the flat loop 21. The ends of the tinted strips 10 and 11 are then inserted into the return bend loop 21, and the lugs 26 and 27 fitted into them.

The spring means 13 can be mounted in the tubular section 20 before the strips are inserted into the return bend portion 21 and anchored, as at 22. Thus, when the ends of the strips have been inserted in the support member 12, as above described, the springs are fastened to the strips with the rivets 24 and 25. The eye shade assembly is then completed.

To apply the eye shade to a pair of eye glass frames, the wearer grasps the outer ends of the strips 10 and 11, pulls them to separate the inner ends, slips a hook, for example hook 30, in the location shown in Fig. 1, and hook 32 over that same lens frame. The hook 33 is then slipped over the top of lens frame 3, and hook 31 is passed around the outer edge of lens frame 3. When the wearer releases the ends of the tinted strips 10 and 11, the coil spring pulls them towards each other, causing the hooks 30 and 31 to grip the outer edges of the lens frames 2 and 3. The eye shade may then be adjusted between the two extreme positions shown in Fig. 1, or to intermediate positions.

If the eye shade is moved upwardly until the hooks 30 and 31 engage the under side of the hinges 6 and 7, the shade will be in its uppermost position. In that position, the wearer may look straight ahead without looking through the tinted strips, unless his eyes are raised to look upwardly through them. The tinted strips shade the eyes, even in that position. If the wearer is in need of protection against bright light, he can slide the strips downwardly until the hooks 32 and 33 rest on the upper edge of the lens frames 2 and 3. In that position, the lowermost edges of the tinted strips 10 and 11 will be approximately at the center of the lens frames 2 and 3. In that position, the wearer, by lowering his head, may see through the tinted strips or, by moving his head to an erect position, and looking straight ahead, can look under the tinted strips and have unobstructed view with no impairment of vision. When the eye shade is in its lowermost position, the eyes are protected from bright sunlight. Furthermore, since the wearer may always look under the lowermost edges of the strips 10 and 11, the eye shade may be worn at night when driving automobiles, and have protection from the glare of oncoming vehicle headlights.

Having thus described the invention, it will be apparent to those skilled in the art to which it pertains, that modifications and changes may be made in the details of construction, without departing from the spirit or the scope thereof.

Therefore, what is claimed as new and desired to be secured by Letters Patent is:

1. An eye shade adapted for attachment to eye glass frames having temple pieces comprising a pair of strips of tinted, transparent material arranged end to end, means for slidably supporting the adjacent ends of the strips, means connected to said support and strips for yieldingly urging said adjacent ends towards each other, each strip having a hook at the outer end thereof for receiving and frictionally engaging the outer edge of the lens frame at a location below the temple piece, and another hook on top of the strip adapted to receive and engage the upper edge of the lens frame, said strips being slidable vertically from an uppermost position, where the two end hooks of said strips engage the underside of said temple pieces, and to a lowermost position where the hooks on the top of said strips engage the upper edges of said lens frames, the width of each strip being such that, when in lowermost position, the wearer may look through or under said strips, and when in the uppermost position, the lower edges of said strips are above the normal line of sight but shade the eyes from light rays projecting downwardly onto the eyes of the wearer, said yieldingly urging means urging the end hooks of said strips against the outer edges of the lens frames, whereby the strips may be frictionally held in positions intermediate said upper and lowermost positions on the lens frame.

2. An eye shade as in claim 1, in which the inner ends of said strips are slotted to form tongues, the support means comprises a looped member for receiving said tongues, said looped member having a tubular portion at its upper edge, and the urging means connecting said support means and strips comprises a coiled spring extending through said tubular portion, and means securing the spring at substantially its center to said tubular portion, the free ends of said springs being secured while in tension to the respective ends of said tinted strips.

3. An eye shade as in claim 1, in which the inner ends of said strips are slotted to form tongues, the support means comprises a looped member for receiving said tongues.

4. An eye shade as in claim 1, in which the inner ends of said strips are slotted to form tongues, the support means comprises a looped member for receiving said tongues, the tongue of each strip is provided with a lug, and the looped member is provided with slots to receive said lugs to thereby limit the separation of inner ends of said strips when the yielding means is extended.

5. An eye shade as in claim 1, in which the upper edges of the tongues and the support are so arranged that said upper tongue edges are covered by the support means.

6. An eye shade as in claim 1, in which the inner ends of said strips are slotted to form tongues, the support means comprises a looped member for receiving said tongues, said looped member having a tubular portion at its upper edge, and the urging means connecting said support means and strips comprises a coiled spring extending through said tubular portion, means securing the spring at substantially its center to said tubular portion, the free ends of said springs being secured while in tension to the respective ends of said tinted strips, and that the tongue of each strip is provided with a lug, and the looped member is provided with slots to receive said lugs to thereby limit the separation of inner ends of said strips when the yielding means is extended.

References Cited in the file of this patent

UNITED STATES PATENTS

| Number | Name | Date |
|---|---|---|
| 1,562,086 | Gilkerson | Nov. 17, 1925 |

FOREIGN PATENTS

| Number | Country | Date |
|---|---|---|
| 268,699 | Great Britain | Apr. 7, 1927 |